United States Patent
Benner, Jr.

(10) Patent No.: US 7,688,432 B1
(45) Date of Patent: Mar. 30, 2010

(54) ROTARY POSITION DETECTOR AND ASSOCIATED METHODS

(76) Inventor: William R. Benner, Jr., 3214 Regal Crest Dr., Longwood, FL (US) 32779

( * ) Notice: Subject to any disclaimer, the term of this patent is extended or adjusted under 35 U.S.C. 154(b) by 52 days.

(21) Appl. No.: 12/017,193

(22) Filed: Jan. 21, 2008

Related U.S. Application Data

(60) Provisional application No. 60/886,168, filed on Jan. 23, 2007.

(51) Int. Cl.
*G01B 11/26* (2006.01)

(52) U.S. Cl. .................................................. 356/138

(58) Field of Classification Search .................. 356/138; 250/231.13, 230, 231.14, 237 R; 340/870.37
See application file for complete search history.

(56) References Cited

U.S. PATENT DOCUMENTS

| | | | | |
|---|---|---|---|---|
| 3,217,170 | A | * | 11/1965 | Bin-Lun ................... 250/230 |
| 3,824,878 | A | * | 7/1974 | Grosseau ................... 477/121 |
| 3,983,391 | A | | 9/1976 | Clemons |
| 4,247,769 | A | * | 1/1981 | Warner ................... 250/231.14 |
| RE31,062 | E | | 10/1982 | Burke, Jr. |
| 4,864,295 | A | | 9/1989 | Rohr |
| 5,225,770 | A | | 7/1993 | Montagu |
| 5,235,180 | A | * | 8/1993 | Montagu ................ 250/231.13 |
| 5,671,043 | A | | 9/1997 | Ivers |
| 5,844,673 | A | * | 12/1998 | Ivers .......................... 356/138 |
| 6,218,803 | B1 | | 4/2001 | Montagu et al. |
| 6,921,893 | B1 | | 7/2005 | Petschik et al. |
| 7,034,282 | B2 | | 4/2006 | Oka et al. |
| 2008/0013106 | A1 | | 1/2008 | Sidor et al. |

* cited by examiner

*Primary Examiner*—Tarifur R. Chowdhury
*Assistant Examiner*—Isiaka O Akanbi
(74) *Attorney, Agent, or Firm*—Allen, Dyer, Doppelt, Milbrath & Gilchrist, P.A.

(57) ABSTRACT

A rotary position detector includes a housing and a light source positioned to emit light rays onto a light detector assembly having a first number of toroidal-sector-shaped light sensors, which are disposed in "A,B" pairs about a motor shaft axis so that each "A" detector is circumferentially positioned between two "B" detectors. A light blocker is affixed for rotation with a motor shaft between the light detector assembly and light source and has a second number of opaque, pie-shaped elements arrayed about the shaft, the second number equal to one-half of the first number. An angular subtense of the light blocker elements is greater than that of a detector element. A signal connection between the light detector elements and a circuit measures a signal from the "A" and "B" detectors relating to an amount of light falling thereon, a difference therebetween related to an angular position of the shaft.

16 Claims, 9 Drawing Sheets

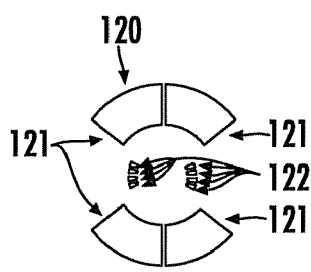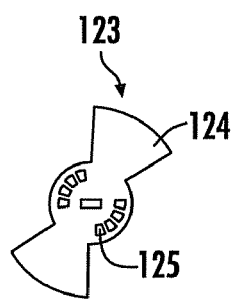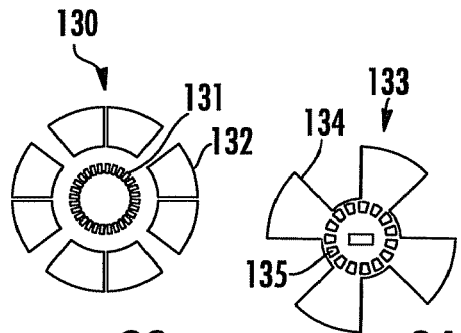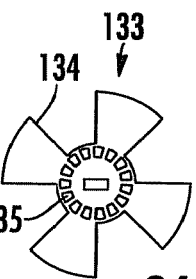
FIG. 20  FIG. 21  FIG. 23  FIG. 24
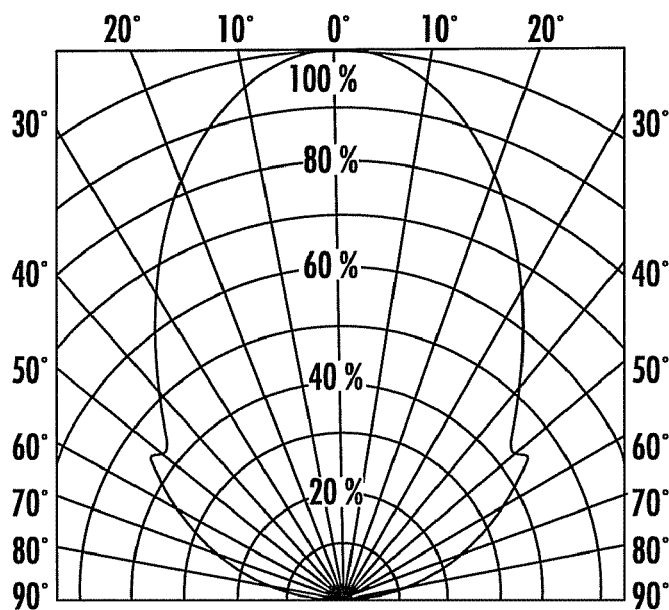
RELATIVE RADIANT OUTPUT (%)
FIG. 22

ROTARY POSITION DETECTOR AND ASSOCIATED METHODS

CROSS-REFERENCE TO RELATED APPLICATION

This application claims priority to provisional application Ser. No. 60/886,168, filed Jan. 23, 2007.

BACKGROUND OF THE INVENTION

1. Field of the Invention

This invention relates to rotary position detectors for indicating the angular position of a shaft or other rotating element. More particularly, this invention relates to such position detectors used on motors and galvanometer-based optical scanners.

2. Description of Related Art

Rotary position detectors have many uses, such as detecting the position of the shaft on a motor, for the purpose of electrical commutation. Another such use is to detect the position of a tensioner pulley in a magnetic tape player or web-type printing press, for the purpose of maintaining a constant tension on the tape or paper. One of the more recent uses of a rotary position detector is to sense the position of the accelerator (gas) pedal in an automobile that uses electric motors as a partial or complete means of driving the wheels.

Galvanometer-based optical scanners are used to direct non-moving input light beams to a target area. This type of scanner uses a limited-rotation motor to impart rotational motion onto an optical element, such as a mirror. Normally the mirror is mounted directly on the output shaft of the motor. A position detector is included within the motor, either close to the output shaft, or on the "rear" portion of the motor. This position detector normally outputs a current or voltage signal that is proportional to the relative angle of the motor shaft, and thus, relative to the angle of the mirror with respect to the non-moving input light beam.

Galvanometer-based optical scanners direct a laser beam for marking, cutting, or display purposes, for which positioning accuracy and repeatability can be of critical importance. Therefore, one of the limiting factors of accuracy and repeatability is the performance of the position detector used with the optical scanner.

Ideally, a rotary position detector should only be sensitive to the rotational angle of the scanner shaft. Since a mirror is connected directly to the scanner shaft, it is the rotation angle of the shaft that dictates the direction of the exiting light beam. Axial motion and radial motion generally will not affect the target position of the light beam being reflected by the mirror, and since it is the target light beam position that is important to the scanning system, the output of the position detector should indicate the target position, and be insensitive to things that do not affect that target position, such as axial and radial motion. Axial shaft motion may occur as a dynamic behavior of the scanner. For example, if the magnetic construction of the scanner is not perfect, the shaft may surge outward or inward when strong current pulses are put into the scanner during strong acceleration and deceleration. Radial motion of the scanner can occur as a result of bearing "rumble" or imperfections in manufacturing, which allow a small amount of radial motion of the shaft. Radial shaft motion can also occur as a dynamic effect, if the rotor is not perfectly concentric with the stator components, or if the inertial load (mirror and mount) attached to the output shaft is not perfectly balanced.

A servo controller is connected between the position detector and the motor. If the position detector produces some output as a result of axial or radial shaft motion, the servo controller will mistakenly interpret this errant output as a change in rotational position, resulting in a positioning error of the overall system. For that reason, a perfect rotary position detector will produce an output only as the result of rotational motion, and will not produce an output as the result of axial or radial motion.

An additional desirable property of a rotary position detector, especially for galvanometer scanners used with analog servo systems, includes the feature that the output voltage or current be linear with respect to the rotation angle. That is to say, an incremental change in shaft rotation should produce an equally incremental change in output signal from the position detector. Further, the signal-to-noise ratio should be as high as possible.

There are several ways to sense the position of the shaft within an optical scanner. Two popular types of position detectors comprise capacitive position detectors and optical position detectors.

Capacitive position detectors were used in some of the very earliest galvanometer-based optical scanners. In one known detector, a rotating dielectric butterfly is connected to the scanner shaft, and the detection plates are fixed.

Optical position detectors have emerged recently as the position detector of choice in the field of galvanometer-based optical scanning. Typically, optical position detectors can be made small, and have low inertia, and can be manufactured at low cost. These properties make optical position detectors desirable for optical scanners applied in commercial and consumer markets.

One type of optical position detectors is a "shadow cast" position detector, wherein a large area of light sensor material is attempted to be evenly illuminated, and a shadow is cast on the light sensors by a light blocker. Optical position detectors can use photocells as the light sensors. These photocells are most commonly bulk-area PIN photodiodes, and are used in the "photovoltaic" mode, whereby an electrical current is produced by the photocell, and amplified by an op-amp. The amount of electrical current increases linearly as the intensity of the light over the entire area of the photocell increases linearly. The amount of electrical current also increases linearly as the illuminated portion of the photocell is linearly increased, as long as the illumination across the entire area is constant. That is, if light is illuminating half the light sensor area, and light is blocked from the other half of the light sensor area, the electrical current that is output will be half the amount as of that for a complete illumination of the light sensor, yielding a linear relation of position detector output to photocell area illumination.

Regardless of the type of position detector used, capacitive or optical, all known position detectors are believed to suffer from one common problem: They all output a signal that is indicative of relative shaft rotation, but they do not output a signal that is indicative of absolute shaft rotation. That is to say, it is impossible for the servo controller to read the position signal voltage or current, and know the precise mechanical angle of the shaft, in absolute terms. This is because the output from the photocells or the capacitive plates is proportional to the light produced by the LED or the signal produced by the oscillator, respectively. In the case of the optical position detectors, if the light from the LED increases due to environmental changes, or due to component drift, the output produced by the photocells will increase proportionally. This proportional increase will fool the servo into believing that the shaft has been rotated to a greater mechanical angle. The servo will then try to compensate for this, and generate an error.

All known position detectors attempt to correct for this by using an AGC circuit such as known in the art. In the case of the optical position detectors, the light received by all photocells are added together, to form a "total light" signal voltage. This "total light" voltage is compared to a reference voltage, and an error signal is produced that drives the LED. If the "total light" is sensed to have increased, then the light output by the LED is made to decrease by a corresponding amount, thus trying to maintain the sensitivity of the position detector over time. However, the use of AGC is only good enough to correct first-order problems. All known position detectors suffer from position offset drift (a change in what the position detector believes is the "absolute zero" degree position of the shaft) and position scale drift (a change in what the position detector indicates in terms of volts per degree) due to second-order effects, such as drift of the reference voltage itself, or change of the feedback resistors used in the op-amp circuits. These changes occur with time and temperature.

In the past, attempts have been made to provide additional signals to rotational position detectors that are indicative of certain absolute positions. On an elective or automatic basis, the servo can exercise the galvanometer scanner in search of these additional signals, and thus become aware of the absolute position scale and position offset of the position detector. When implemented in a capacitive position detector, this technique has several parasitic problems. First, capacitive position detectors are very sensitive to the shape of the plate members. Plates with protrusions or notches will have an impacted linearity due to fringe effects that happen as a result of the protrusions or notches. Fringe effects will also impact linearity if additional capacitive plates are used. And whether this technique is used with an optical position detector or with a capacitive position detector, the specially shaped moving butterfly is more expensive to manufacture.

The dominant servo used to control galvanometer-based optical scanners has been the PID servo system made entirely with analog components (analog servos). Analog servo systems have been used because they are relatively inexpensive and relatively simple, and also because up until now, digital servo systems could not achieve the high resolution and high sample rate necessary to be usable with the fastest galvanometer scanners. In order to support the fastest galvanometer scanners currently on the market, and achieve step times in the sub-100-microsecond range, a sample rate of 200 kHz must be used, along with a sampling resolution of 16 bits. And because of the multiple internal calculation steps needed, floating point calculations are highly desirable. Until recently, it was cost-prohibitive to implement a servo controller in a digital form with this high sample rate and resolution. However, with the constant progress that inevitably occurs in technological fields, digital signal processors (DSPs) and ND converters are now becoming available with sufficient speed and at a reasonable cost, which will help cause a shift from analog servos to DSP-based servos for use with galvanometer scanners.

Analog servos typically have a relatively large number of potentiometers used to "tune" the servo for optimal performance. These potentiometers adjust a number of servo parameters including servo gain, damping, notch filter frequency, notch filter depth, input gain, input offset, etc. There are typically also two additional potentiometers to adjust the position scale and position offset of the position detector. Although these last two are not servo parameters in the strictest sense, they certainly do affect servo performance and accuracy. All these potentiometers must be manually adjusted, or "tuned," by humans. Typically this tuning is done at the factory, but sometimes further tuning is required in the field. Because engineers may not be the end-users of systems with galvanometer scanners, any non-factory tuning can result in sub-optimal operation.

The shift towards DSP-based servo systems will obviate the need for all these adjustment potentiometers, because servo parameters such as servo gain, damping, notch filter frequency, etc. will all be set by algorithmic constants. These algorithmic constants can be manually "tuned" by humans, in a similar way that the potentiometer adjustments were made, only using a user interface to make the adjustments, or alternatively these algorithmic constants may be tuned automatically, by some intelligent tuning algorithm. This is possible because almost all the information about the scanning system can be gleaned merely by exercising the scanner and observing what happens with the position signal. For example, the torque constant of the scanner can be derived by observing the back-EMF of the scanner. Stated in mechanical engineering terms KT=KE. That is, dyne centimeters of torque per amp is directly proportional to motor back-emf volts per degree per second. Thus, if the servo creates scanner motion, and can measure the "degrees per second" and the motor back emf, then the servo can derive the precise torque constant (KT) of the scanner.

Once the KT is known, the servo could next apply a pulse of known current for a short time, and measure the angular acceleration that results, and thus the servo can glean the system inertia (J) of the rotor, mirror, and position detector, since force equals mass times acceleration. Therefore, inertia equals KT divided by acceleration.

Next, the servo could wrap a light loop around the scanner and perform a bode plot, thus revealing all system resonances. With this information, the servo could set all constants for the poles and zeros of notch and bi-quad filters.

Once the torque constant, system inertia, and system resonances are all known, all servo parameters could be easily set in a matter of seconds, with digital precision, achieving the absolute maximum performance from the scanner and servo system. But in order for all this to happen, the servo system needs one fundamental piece of information. The servo must know the "position scale." That is, the servo must first know the volts per degree from the position detector.

As discussed previously, with previously known position detectors, it is impossible for servos to know the position scale with absolute certainty; so it is impossible to make a digital servo that will completely auto-tune. Up until now, scanner manufacturers have side-stepped this problem by putting small memory chips within the scanner. A digital servo could read this memory chip, and this memory chip is pre-programmed at the factory with information including the torque constant, position scale and position offset, and other information about the scanner. The problem with this approach is that these parameters can change over time. The torque constant of the scanner depends on the magnetism of the rotor (or other scanner components), and this magnetism certainly changes with temperature, and, if the scanner is abused or overheated, can also change with time. Position detector components also change with time due to component drift and also due to temperature and other environmental effects.

Therefore, it would be beneficial to provide a rotary position detector having improved signal-to-noise ratio and also provide absolute position accuracy.

SUMMARY OF THE INVENTION

The current invention is directed to an optical position detector that provides low inertia operation and can be used with small optical scanners. Unlike other known position detectors, the current invention provides improved signal-to-noise ratio and absolute position accuracy.

A rotary position detector of the present invention comprises a housing having an inner space and a light source positioned to emit light rays into the housing's inner space. A base is positioned within the housing's inner space beneath the light source.

A light detector assembly is positioned within the housing's inner space and comprises a first number of substantially toroidal-sector-shaped light sensors positioned on the base. The light sensors are disposed in pairs about an axis of a motor shaft, each pair comprising one "A" detector element and one "B" detector element. The pairs are disposed so that each "A" detector is circumferentially positioned between two "B" detectors and each "B" detector is positioned between two "A" detectors.

A light blocker is affixed within the housing's inner space for rotation with the motor shaft between the light detector assembly and the light source. The light blocker comprises a second number of opaque, substantially pie-shaped, substantially equal-surface-area elements arrayed about the motor shaft axis, the second number being equal to one-half of the first number. An angular subtense of each of the light blocker elements is greater than an angular subtense of a detector element, and a radial extent of each of the light blocker elements is greater than a radial extent of each of the detector elements.

A signal connection is provided between the light detector elements and a circuit for measuring a signal from the "A" detectors and the "B" detectors. This signal relates to an amount of light falling thereon. A difference between the "A" detector signal and the "B" detector signal is thence related to an angular position of the motor shaft.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWING

FIG. 10 shows a central "zero degrees" starting position, and an arrow designating "positive" rotation.

FIG. 20 shows a light sensor array including "normal" and "high-accuracy" light sensors.

FIG. 21 shows a light blocker for use with the light sensor array of FIG. 20.

FIG. 22 shows the relative light output from a typical light-emitting diode.

FIG. 23 shows another embodiment of a light sensor array including normal and high-accuracy light sensors.

FIG. 24 shows a light blocker for use with the light sensor array of FIG. 23.

DESCRIPTION OF PREFERRED EMBODIMENTS

Figure 1:
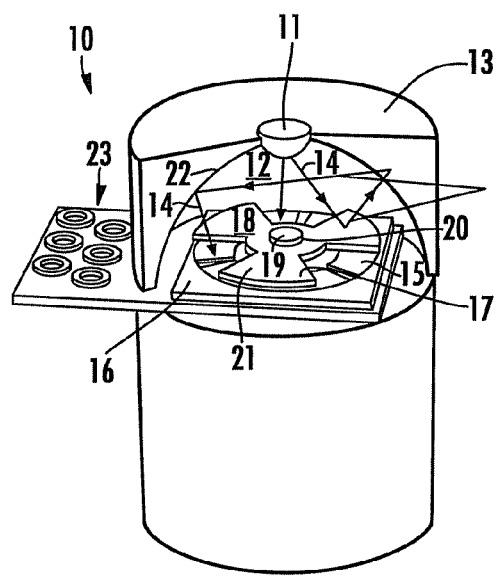
FIG. 1 is a cutaway view of an embodiment of a rotary position detector of the current invention.
Figure 3:
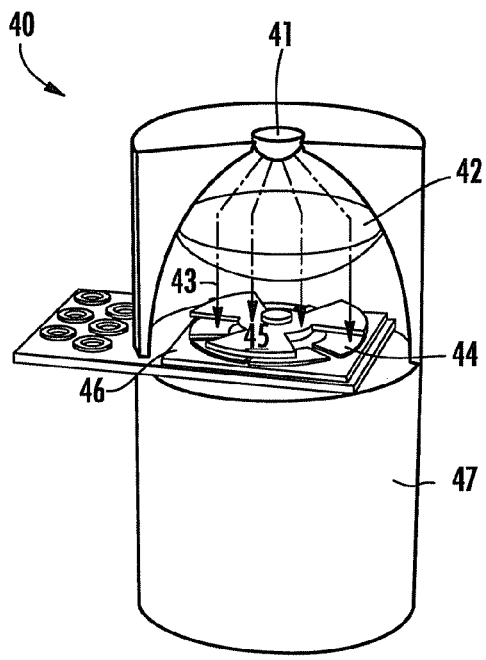
FIG. 3 shows a cutaway view of an embodiment using a point light source and lens.

The present invention will now be described more fully hereinafter with reference to FIGS. 1-27, in which preferred embodiments of the invention are shown. Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, or other references mentioned herein are incorporated by reference in their entirety. In case of conflict, the present specification, including any definitions, will control. In addition, the materials, methods, and examples given are illustrative in nature only and not intended to be limiting. Accordingly, this invention may be embodied in many different forms and should not be construed as limited to the illustrated embodiments set forth herein. Rather, these illustrated embodiments are provided so that this disclosure will be thorough and complete, and will fully convey the scope of the invention to those skilled in the art. Other features and advantages of the invention will be apparent from the following detailed description.

The optical position detector of the present invention uses the "shadow cast" technique. The individual elements of this position detector are improved when compared with other known optical position detectors, yielding improved results from the standpoint of position accuracy and also from the standpoint of signal-to-noise ratio. Moreover, all embodiments of this position detector allow for absolute position determination based on an ability for the position detector to indicate when it has reached certain angular conditions. Several embodiments of this invention provide a high-resolution, high-frequency output that can be used to continually monitor absolute position.

An embodiment of this invention is described in the context of its use within a motor or galvanometer scanner, although this is not intended as a limitation. In the position detector 10 of FIG. 1, a light source 11 positioned within an inner space 12 of a housing 13. The housing 13 is adapted to house the position sensor system components and to absorb unwanted light rays from the environment, and also to connect the components to the shaft assembly of a motor in a particular embodiment. The housing 13 can comprise, for example, injection-molded plastic or machined metal, although this is not intended as a limitation.

The light source 11 preferably produces a substantially circumferentially uniform field of light, directing light rays 14 toward a plurality of light sensors 15, which can comprise, for example, toroidal-sector-shaped elements. The sensors 15 are positioned on a base 16 in spaced relation from the light source 11. A light blocker 17 having a plurality of substantially pie-shaped blades 18 periodically interrupts the light rays 14 from reaching certain areas of the light sensors 15, by casting a shadow thereover.

The light blocker 17 in this configuration is operably connected to a motor shaft 19 that extends through an aperture 20 in the base 16. The rotation of the motor shaft 19, driven by a motor, causes the light blocker 17 to rotate. As the illuminated areas of some light sensors 15 increase (when less of the light sensor area is under a shadow), an output signal from the light sensors 15 also increases. Simultaneously and by the same amount, as the illuminated areas of other light sensors 15 decrease (when more of the light sensor area is under a shadow), the output signal from these light sensors 15 decreases.

There are a number of possible configurations of the position detector light source of the present invention. In a particular embodiment of FIG. 1, a top surface 21 of the rotating light blocker 17 and an inner wall 22 of the housing 13 can be reflective. In this configuration, the light blocker's top surface 21 and the housing's inner wall 22 "recycle and reconcentrate" light rays 14 that would otherwise be simply absorbed. The reflected "recycled" light rays 14' are then reflected toward un-blocked light detector areas, increasing the signal-to-noise ratio because the light sensors 15 receive both direct light rays 14 from the light source 11 and indirect light rays 14' that have been reflected, recycled, and concentrated.

In another embodiment (FIG. 2), a rotary position detector 30 can comprise a single LED light source 31 with a housing inner wall 32 comprising a curved reflector upon which the light source 31 emits light rays 33. In this arrangement, an advantage is provided in that the light rays 33 impinging on the light sensors 34 are parallel, providing maximum light output, since the light sensors are "Lambertian receivers." Another benefit is that the position detector 30 may be made more compact, from an axial perspective. In addition, a hole or opaque area 35 can be placed in the center of the reflector 32 to prevent the otherwise unused central light from projecting onto the light blocker 36 and light sensors 34, which are similarly configured to those discussed above with reference to FIG. 1.

In another embodiment of a rotary position detector 40, a single LED 41 can be used as the light source (FIG. 3), with a lens 42, for example, a piano-convex lens, used as a light concentrator. An advantage of this embodiment 40 is again that the light rays 43 impinging on the light sensors 44 are substantially parallel, providing maximum light output, since the light sensors 44 comprise "Lambertian receivers." In addition, when using an LED 41 with a lens 42 as shown, more light from the LED 41 does "work"; so the signal-to-noise ratio is kept high. Here the sensors 44 are interposed between the light blocker 45 and a circuit board/base 46, all atop a motor body 47.

In an alternate embodiment of a rotary position detector 50 (FIG. 4), a light-concentrating lens 51, for example, a piano-convex lens, may be imprinted with an opaque area 52 in the shape of the light blocker, with the lens 51 mounted directly to the motor shaft 53. In this embodiment 50 the light blocker and concentrator are combined into a single rotating element, here, the imprinted lens 51, and substantially parallel light rays are directed onto the light sensors beneath.

Figure 5:
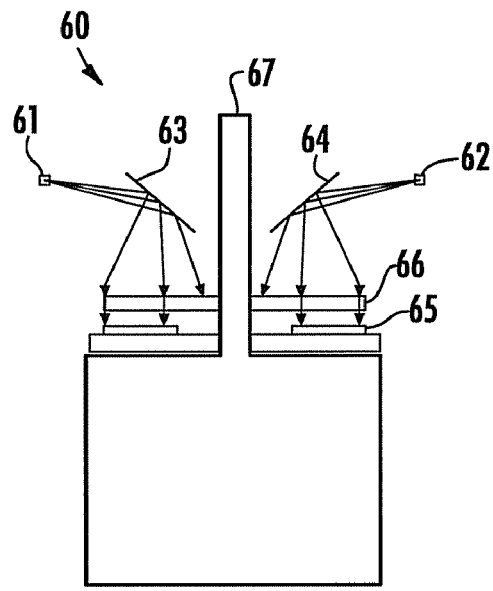
FIG. 5 shows an embodiment in which two light sources and reflectors are used.

An alternative embodiment of a rotary position detector 60 can comprise two or more LEDs 61,62 as a light source and two or more reflectors 63,64 as the light concentrators (FIG. 5). The light sensors 65 and light blocker 66 are substantially as described above. This arrangement provides an advantage that the output shaft 67 can pass through the detector 60, thus allowing the inertial load to be located close thereto, which may improve overall system accuracy, especially dynamic accuracy. This embodiment 60 should be manufactured carefully, owing to the plurality of light sources 61,62. Matching should be done to ensure maximum performance. Alternatively, the two LEDs 61,62 may be replaced with a single LED feeding two optical fibers, thus achieving the advantage of a single LED. The use of a fiber to feed light into the position detector is described in further detail below.

When using an LED with a lens or a reflector, as in the embodiments 10,30,40,60,70 of FIGS. 1-3, 5, and 6, there is a greater insensitivity to radial or axial motion, since the light rays are more parallel. A well-defined shadow is always produced by the light blocker when the light rays are parallel. Also, the light source does not need to be located close to the light sensors, as is the case with other known optical position sensors. A light concentrator can comprise reflectors of various shapes, a vortex lens, a holographic optical element, or other type of diffractive optics known in the art, and the present invention is not intended to be limited to a particular arrangement.

Figure 6:
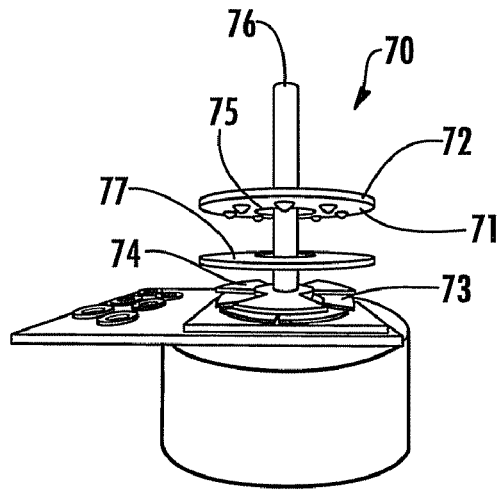
FIG. 6 shows a cutaway view of an embodiment in which a plurality of light sources are used.

In another embodiment of a rotary position detector 70, a plurality of LEDs 71 are arranged in a "ring" fashion, mounted to a circuit board/base 72 above the light sensors 73 and light blocker 74 (FIG. 6). There are several advantages to this embodiment 70. The circuit board/base 72 that supports the "ring of LEDs" 71 may have a hole 75 therethrough, thus allowing the motor shaft 76 to pass therethrough and the inertial load to be located close to the position detector 70.

Another advantage is that multiple LEDs 71 provide more overall light when compared with a single LED, which improves signal-to-noise ratio. Empirically it has been found that between 6 and 8 LEDs work well. However, it should be noted that, as described for the embodiment 60 of FIG. 5, the LEDs 71 should preferably be matched for optimal performance. Also, nonlinearity can result if the LED type and placement are not chosen wisely. To reduce the impact of non-matched LEDs 71, a diffuser element 77 can be used between the LEDs 71 and the light blocker 74, such as a frosted piece of plastic or other semi-transparent material.

The position detector light source can comprise a single LED or a plurality thereof, as discussed above. A "wide-angle" light source is not necessarily required as in previous known detectors; however, for maximum rotation-to-output-signal linearity, it is important that the light source provide substantially circumferentially uniform illumination.

Although LEDs have been described for use as the light generating means within the light source, it will be understood by one of skill in the art that alternative light generating means can also be used with similar results. One such alternative is an incandescent light bulb, which can be made very small and generate more light than an LED, thus producing a higher signal-to-noise ratio from the position detector. Moreover, since most light sensors have a higher response to infrared light than to visible light, the incandescent light bulb can be operated below the threshold at which it generates visible light (while still generating infrared light). When operated in this way, lifetime is increased dramatically. Another light source can comprise an electro-luminescent strip.

The position detector light source can be fiber fed; that is, the actual light source can be located remotely, for example, on a servo driver board, and fed to the galvanometer scanner with an optical fiber. This might be done, for example, in military applications where the scanner would have to work at higher temperatures, which would be prohibitive for direct LED operation. Also, when fed by a fiber, a laser can be used as the light-generating means.

Embodiments of the light detector assembly and light blocker will now be discussed, the positioning of which can be as illustrated in FIG. 1, for example, and with reference to FIGS. 7-10. The light detector assembly is positioned within the housing's inner space 12. In the exemplary detector assembly of FIGS. 7-10, the light sensors comprise a first number, here, four, substantially toroidal-sector-shaped, substantially equal-surface-area light sensors 15 that are positioned on a base 16. The sensors 15 are disposed in pairs about an axis of the motor shaft 19. Each pair comprises one "A" detector element 15A1,15A2 and one "B" detector element 15B1,15B2. The pairs are disposed so that each "A" detector 15A1,15A2 is circumferentially positioned between two "B" detectors 15B1,15B2 and each "B" detector 15B1,15B2 is positioned between two "A" detectors 15A1,15A2.

The sensor configuration essentially dictates a configuration of the light blocker 17 and its blades 18. The light blocker 17 comprises a second number, here, two, of opaque, substantially pie-shaped, substantially equal-surface-area elements 18 arrayed about the motor shaft axis 19. Note that the second number (e.g., two) is equal to one-half of the first number (e.g., four). An angular subtense 80 of each of the light blocker elements 18 (here, 60°) is greater than an angular subtense 81 (here, 55°) of a detector element 15 by a differential angular subtense 82 (here, 5°), and a radial extent 83 of each of the light blocker elements 18 is greater than a radial extent 84 of each of the detector elements 15A,15B.

The light blocker 17 is configured such that when the shaft is rotated in a "positive" direction 85 (moving from the configuration shown in FIG. 10 to that in FIG. 9), most of the "A" light sensor elements' area is uncovered, and all the "B" light sensor elements' area is covered. Thus, as the light blocker 17 is rotated, once it fully covers the "B" light sensors 15B, it can actually be rotated further before it fully uncovers the "A" light sensors 15A. This allows the servo to detect precisely when the "A" or "B" sensors are fully covered, and thus detect precisely the outer angles of the position sensor in absolute terms.

Figure 11:
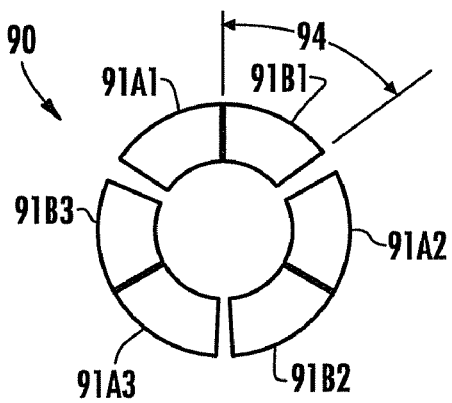
FIG. 11 is an embodiment of a light sensor array having six separate light sensor elements.
Figure 12:
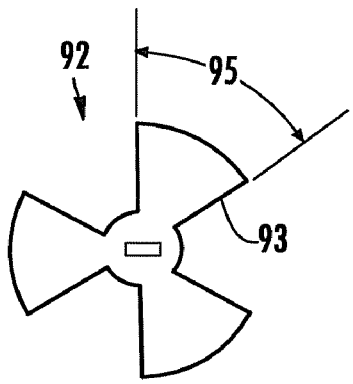
FIG. 12 is an embodiment of a light blocker for use with the light sensor array of FIG. 11.
Figure 13:
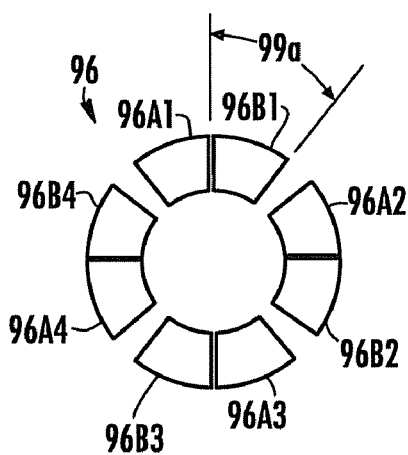
FIG. 13 is an embodiment of a light sensor array having eight separate light sensor elements.

Two alternate sensor/detector arrangements are shown in FIGS. 11-14. In the pair of FIGS. 11 and 12, the light detector assembly 90 includes three pairs of "A" and "B" detector elements 91A1-A3,91B1-B3, and the light blocker 92 comprises three blades 93. The angular subtenses 94,95 are 55° and 60°, respectively. In the pair illustrated in FIGS. 13 and 14, the light detector assembly 96 includes four pairs of "A" and "B" detector elements 96A1-A4,96B1-B4, and the light blocker 97 includes four blades 98. The angular subtenses 99a,99b are 40° and 45°, respectively.

Under normal operating conditions, there is a small amount of light sensor material that is essentially never used. Unused light sensor material contributes to noise while not contributing to signal. This noise can be reduced while fully retaining all the benefits of the sensor by reducing the active area of sensor material where the "A" and "B" sensor elements meet. In an exemplary embodiment 100 (FIGS. 15,16), the active area is reduced by making the sensor elements 101A,101B meet at a point 102, but the active area may also be reduced using other geometric shapes, as will be understood by one of skill in the art.

The individual light sensor elements can comprise a light sensor material or device that operates on the principle whereby a linear increase in light per unit area produces a linear increase in output signal. As a non-limiting example, silicon photodiodes, PIN photodiodes, avalanche photodiodes, and cadmium sulfide cells may be used as the light sensor elements within this invention. These are generically referred to as "photocells."

It is known to arrange individual pairs of light sensors on a single "photocell" die that is rectangular, wherein the manufacturing technique did not allow a hole to be drilled through a silicon die. Although the individual light sensors may be assembled in any way, in a preferred embodiment, all the individual light sensors can be manufactured on a single silicon wafer using standard integrated circuit lithography techniques. Modern silicon wafer manufacturing techniques allow for a hole to be drilled through the center of the wafer, or for holes to be laser cut through the wafer. The use of a single wafer for all light sensor elements maximizes insensitivity to radial and axial motion, since the responses from all sensor elements are most closely matched, by their close proximity on the silicon wafer.

In a particular embodiment, a silicon wafer 110 (FIG. 17) can be cut to produce individual dies 111, each having five faces 112. In this embodiment, not intended to be limiting, four of these dies 111 can then be arranged as in FIG. 18 to form a single light detector array 113. In another embodiment, the light sensors can be manufactured on a common silicon wafer, and then attached to a circuit board, so that output signal can be sent to a servo or other control system.

The light blocker is designed to prevent light from the light source from reaching portions of the light sensors. The light blocker, comprising pie-shaped blades, can be operatively connected to a rotating shaft with epoxy or other attachment means. To ensure consistent alignment and operation, the light blocker may have a "keying" aspect to the hub, such as flatted geometric features.

Since the light blocker only needs to prevent light from reaching the light sensors, it can be made out of a variety of materials. For example, it can be made from ceramic, fiberglass/epoxy, sheet metal, glass, plastic, or any other suitable material that can block light. The light blocker can be made using conventional manufacturing techniques, such as injection molding, laser cutting, stamping, photo-etching, or standard machining techniques.

Figure 8:
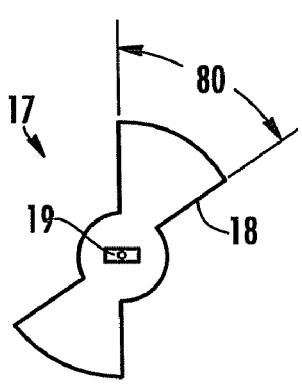
FIG. 8 shows a light blocker for use with the light sensor array of FIG. 7.
Figure 9:
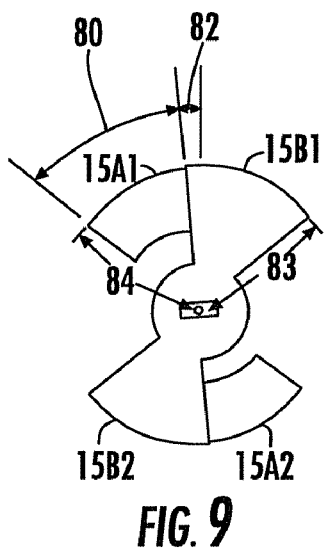
FIGS. 9 and 10 show two orientations of the light blocker and light sensors, wherein linear and nonlinear regions of response are possible.
Figure 10:
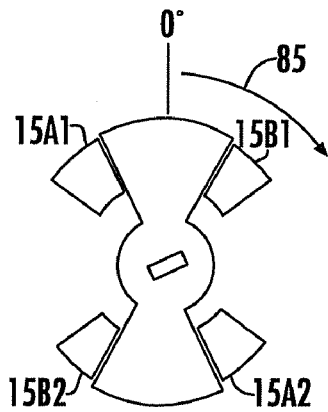
Figure 14:
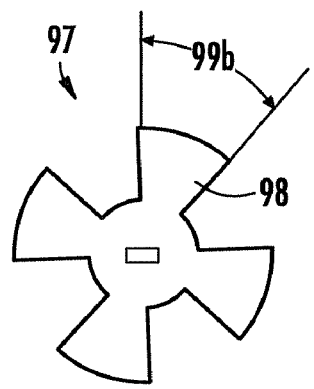
FIG. 14 is an embodiment of a light blocker for use with the light sensor array FIG. 13.
Figure 15:
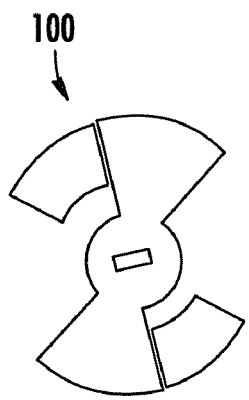
FIG. 15 illustrates a light blocker overlaid upon light sensor elements having reduced active area.
Figure 16:
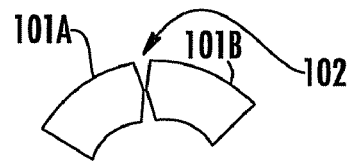
FIG. 16 illustrates the light sensor elements of FIG. 15.
Figure 17:
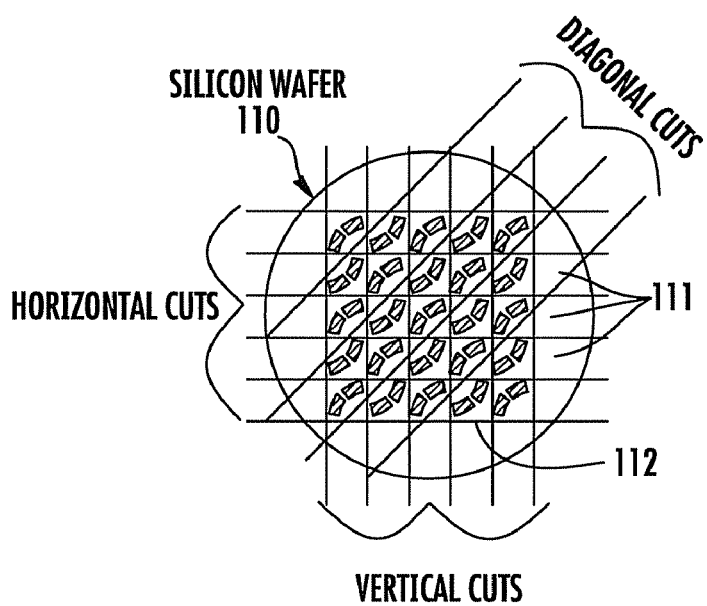
FIG. 17 illustrates how a unitary silicon wafer can be cut to produce individual dies having five cuts.
Figure 18:
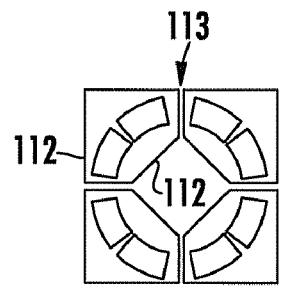
FIG. 18 illustrates the formation of a light detector element from the cutting arrangement of FIG. 17.
Figure 19:
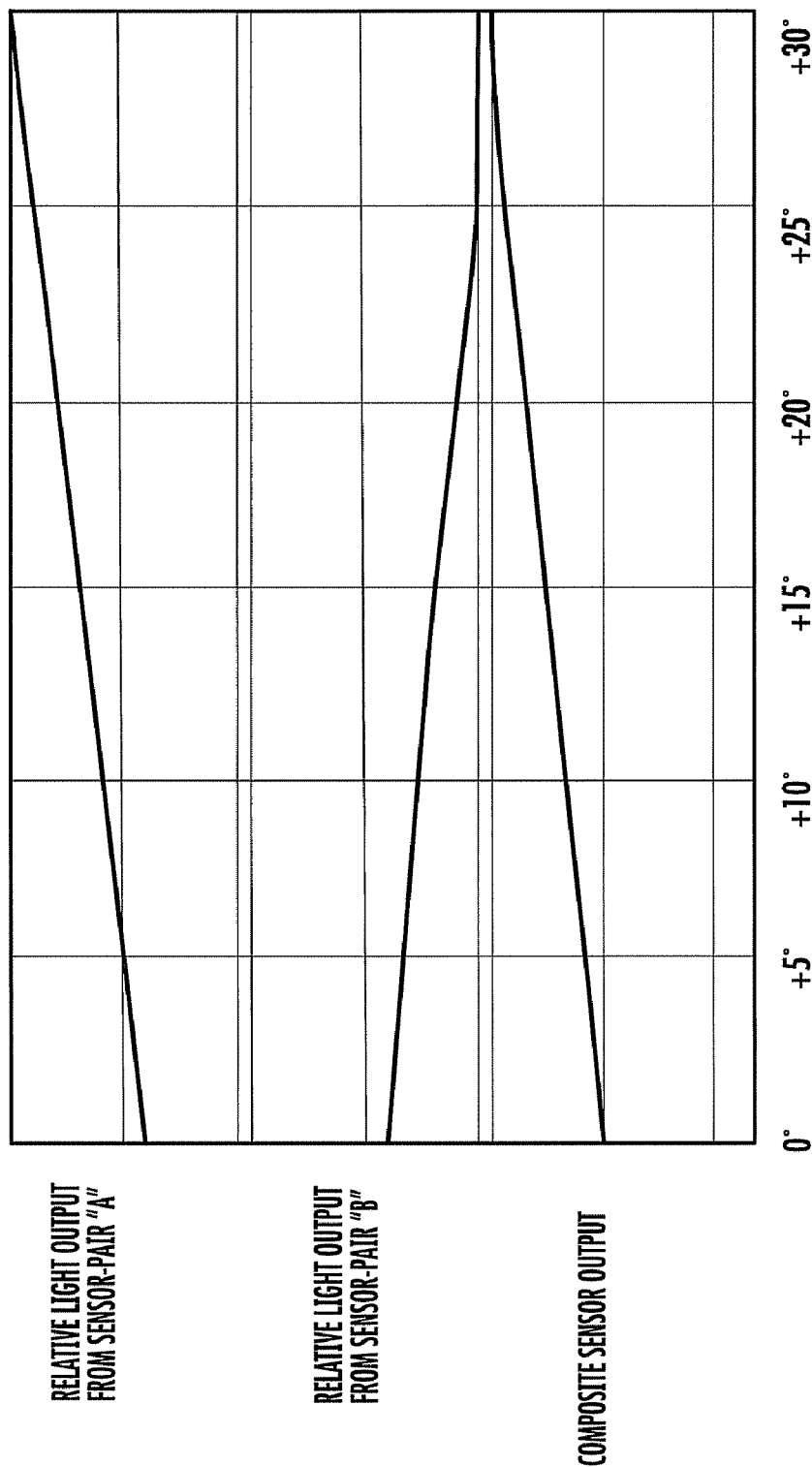
FIG. 19 is a graph of the output signal from the "A" and "B" pairs of light sensors, along with the composite "A minus B" output.

The light blocker may be made to conform to the shapes of FIGS. 8, 12, and 14, or it may be made from a transparent disk whereby the blocking function is performed by an opaque or reflective material deposited onto the transparent disk.

To reduce inertia, the light blocker may be made very thin (as a non-limiting example, 20 thousandths of an inch or thinner), and with a very small diameter (as a non-limiting example, 6 mm or smaller).

Unlike previously known rotary position sensors, the blades of the light blocker have a larger angular subtense than the light sensors, which provides several advantages. One advantage is that, since the angular subtense of the light blocker blades is larger than the angular subtense of the light sensors, when rotated in a "positive" direction, the "B" light sensors become fully blocked before the "A" light sensors are fully un-blocked. Further "positive" rotation still produces a detectable output from the "A" sensors, but does not produce an output from the "B" sensors. Thus this condition of further change from one output with no further change from the other can be used to precisely determine the shaft angle in absolute terms. Another advantage is that if the A and B outputs are subtracted, as is the typical method for this type of sensor, there is a "linear" portion of shaft rotation angle to output signal correspondence, and, at the edges, there is a "nonlinear" portion of shaft angle to output signal correspondence. For example, in FIG. 19, the rate of change of output is shown to change above 25°.

The angular subtense of light blocker blades can be made larger than that of the light blockers by any desirable amount that satisfies the engineering needs of the system. However, for optical scanning applications, it can typically reside in a range of 2-10°.

The number of light blocker blades can comprise as few as 2, and as many as 8, as long as there are two light sensors ("A" and "B") per light blocker blade, with a greater number of light blocker blades reducing the angle of operation of the position detector. The maximum angle (in degrees) over which this position detector can output a single ramp signal from the "main" outputs is equivalent to 360 divided by the number of blades minus the (blade angle of subtense minus the light sensor angle of subtense).

Figure 2:
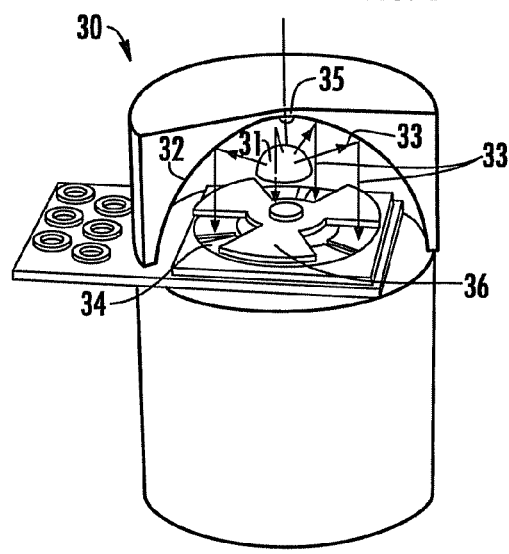
FIG. 2 shows a cutaway view of another embodiment of a rotary position detector.
Figure 4:
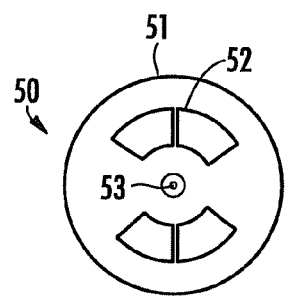
FIG. 4 shows an embodiment of a lens having a light blocker imprinted thereon.

When the light blocker made of a material that substantially completely absorbs light, as in the detector 30 of FIG. 2, light is not permitted to pass through to the detectors. For this example, the light blocker can comprise black plastic, black-anodized metal, or a black coating deposited on a glass disk. In this way, all light that is emitted from the light source and concentrator either strikes the light detectors or is absorbed by portions of the light blocker.

It should be noted also that, although the light blockers described herein have protruding blades, one of skill in the art will recognize that they may have no protrusions, but light-blocking areas. For example, the light blocker can comprise a transparent disk, lens, or other light guide, with blocking areas imprinted thereon.

An optical position detector (FIG. 20) can comprise a light detector array 120 that includes two types of toroidal-sector-shaped light sensors: "normal" light sensors 121 and "high-accuracy" light sensors 122. The "normal" light sensors 121 can be arranged in pairs (here, two pairs) on the outer periphery of the position detector 120 as described above; the high-accuracy sensors 122 can also be arranged in pairs (here, four pairs), and can be positioned toward the central area of the light detector array 120.

A corresponding light blocker 123 (FIG. 21) has two outer blades 124 as discussed previously, plus eight radially disposed apertures 125 positioned to coincide with the high-accuracy sensors 122.

The high-accuracy sensor elements 122 are typically located radially inward on the detector array 120, and are arranged to provide a higher-frequency output per unit of shaft rotation. For example, four "main" light sensors 121 are located radially outward, and provide one ramp of signal output as the shaft is rotated through a 50-degree range. In this example, there are eight high-accuracy light sensors 122, providing two upward ramps and two downward ramps (two full periods) of signal output as the shaft is rotated through the same 50-degree range. The high-accuracy sensors 122 are arranged to provide "complementary" outputs, just like the main light sensors 121. However, they may also be arranged to provide sine-cosine (quadrature) outputs.

Although the high-accuracy sensor elements 122 are shown to be located radially inward in the embodiment of FIG. 20, they may also be located elsewhere, including on the outer circumference of the main light sensors, or to the sides of the main light sensors. The central position is believed advantageous, because it allows the position detector to take advantage of light from the light source that would otherwise be wasted. Moreover, as shown in FIG. 22, normally there is higher-energy output by an LED in the central area of emission.

The high-accuracy sensor elements 122 provide greater positioning accuracy, because they go through an entire period of output signal multiple times faster than the "main" outputs. Thus the "main" outputs can be used as a coarse indication of position, and the high-accuracy outputs can be used as a fine indication of position. Alternatively, for continuous rotation application with normal motors, the high-accuracy outputs may serve as a tachometer, while the "main" outputs serve to indicate absolute position.

Another embodiment of a light sensor array 130 (FIG. 23) can be used to obtain a high-accuracy, high-frequency output signal, with a plurality of high-accuracy sensor elements 131 in the central region, forming a ring, and four pairs of toroidal-sector-shaped main light sensors 132 around the periphery of the array 130. A light blocker 133 that can be used with this embodiment 130 (FIG. 24) comprises four blades 134 and a plurality of central apertures 135 positioned to overlie the high-accuracy sensor elements 131.

Figure 7:
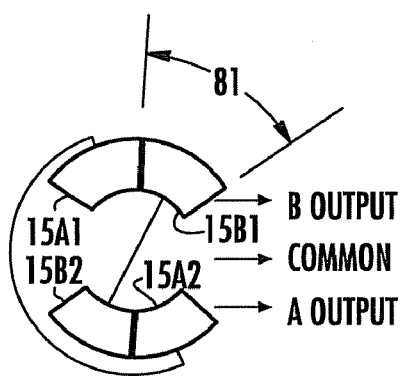
FIG. 7 provides labels designating four separate light sensor elements, indicating one way in which the light sensor elements can be connected to provide output signals, wherein diametrically opposed light sensor elements are connected, and only two outputs are provided.

The signals generated by the rotary position detectors of the present invention will now be discussed. In one embodiment, individual light sensor elements are connected in parallel, so that a minimum of wires are sent to the servo controller (FIG. 7). An exemplary configuration of connector elements 23 is illustrated in FIG. 1. A benefit of this connection scheme is that it reduces the number of wires that are needed to be connected from the position detector to the servo system. However, a common drawback with prior art position sensors is that, if the individual light sensor elements that are connected in parallel do not produce exactly the same amount of output signal as other individual light sensor elements for a given amount of light, then insensitivity to radial and axial motion is not optimal. However, if all light sensor elements are implemented onto a single piece of silicon, as is believed preferable, this problem is minimized.

Figure 25:
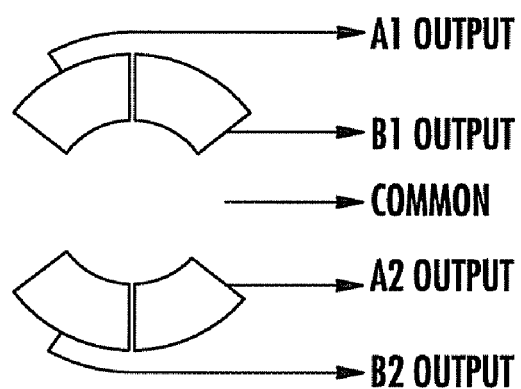
FIG. 25 an alternate mode of light sensor connection to provide output signals wherein the output of each light sensor element is used directly with no connection made to other light sensor elements.
Figure 26:
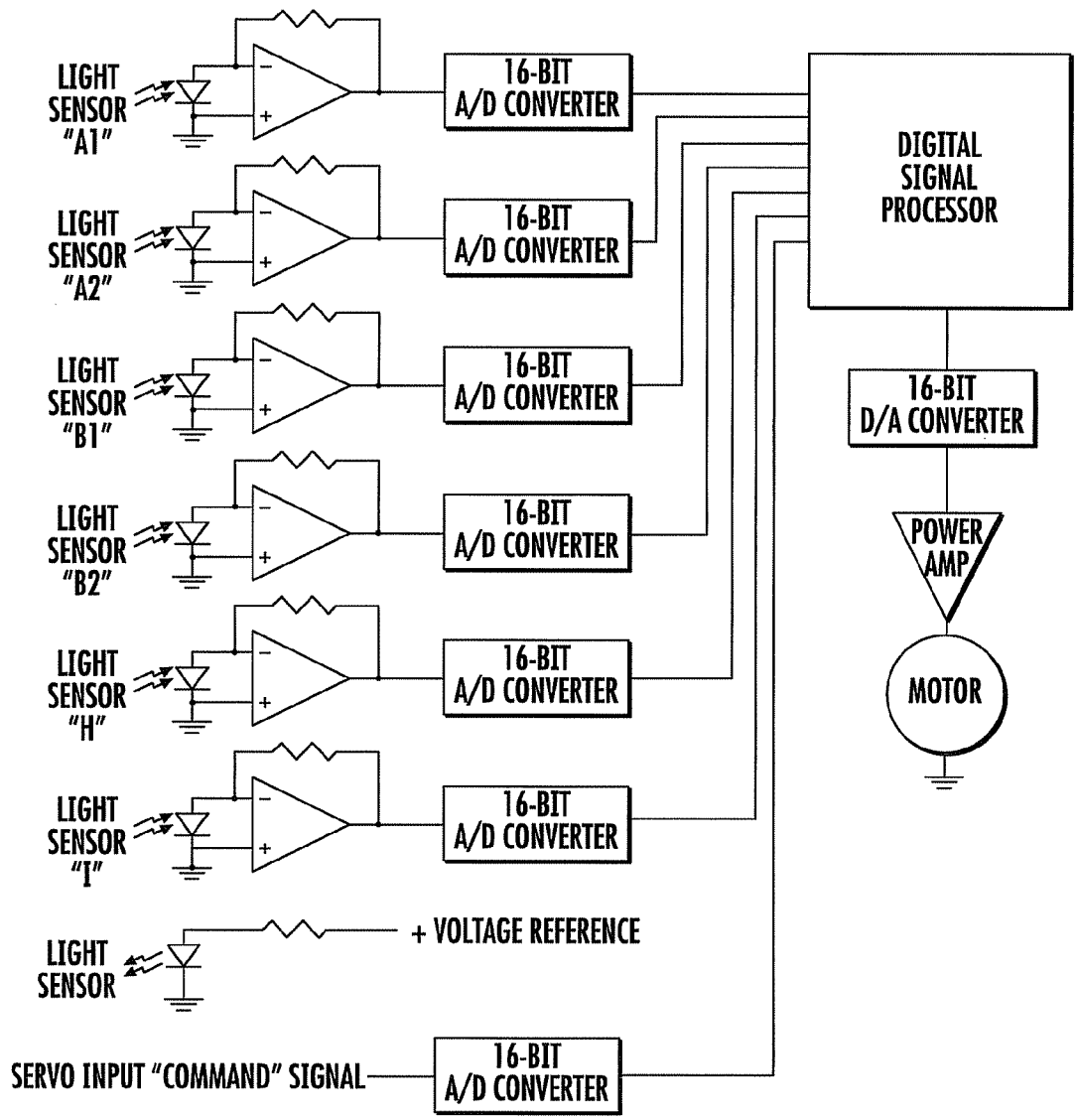
FIG. 26 shows a digital servo system that incorporates a position detector of the current invention.

As an alternative and preferred connection scheme, the output from individual light sensor elements can be connected directly to the servo (FIGS. 25 and 26). An advantage of this arrangement is that the servo can characterize the output from each light sensor and then algorithmically increase linearity and radial insensitivity.

The position detector of the present invention is particularly useful when connected to a digital servo system, which can exercise the scanner and easily locate the point in the shaft rotation at which the "A" and "B" light sensors are completely blocked, and thus determine the extent of angular excursion in absolute terms. A digital servo can use the high-accuracy sensor outputs, when present, to continually track and adjust the position scale and position offset in real time. Because of this, an AGC system is not needed, and the light source can be operated at maximum output all the time, thus maximizing signal-to-noise ratio. Although individual high-accuracy sensor elements are not labeled, for the purpose of illustrating their use with a digital servo, they are shown as "H" and "I" in FIG. 26, and in-phase sensor elements are assumed to be connected in parallel.

The high-accuracy outputs are fed to the servo and amplified in the same way as the main light sensor outputs. However, for some applications, the high-accuracy outputs may be directed to a "Schmidt trigger"-type amplifier to produce a digital output for the servo to consume. When used in this way, a hybrid analog/digital position sensor is produced.

Since the digital servo system has access to highly reliable information in terms of absolute position, the digital servo can perform automatic servo parameter tuning, thus helping to maximize performance from the entire system at all times.

Figure 27:
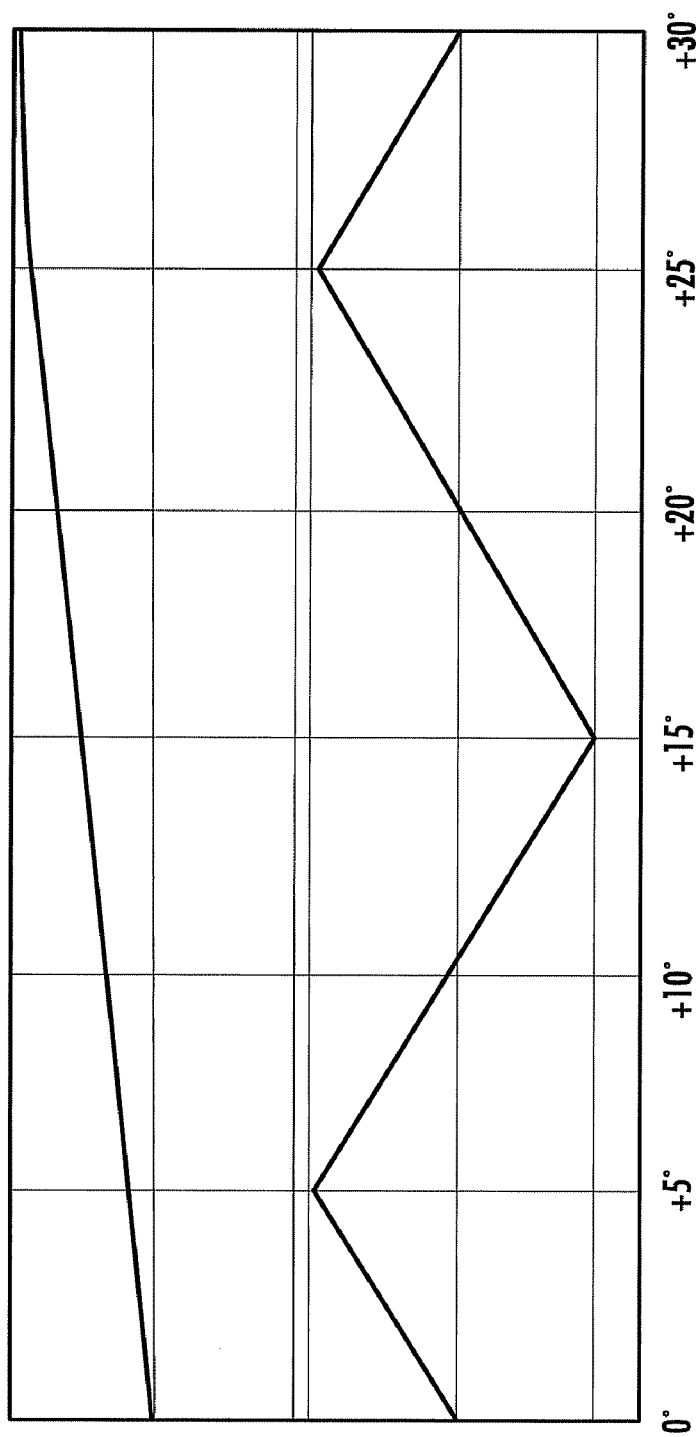
FIG. 27 shows the output signal from both the normal and the "high-accuracy" output.

A graph of the output signal from both the normal output and the high-accuracy output is give in FIG. 27.

In the drawings and specification, there have been disclosed typical preferred embodiments of the invention, and although specific terms may have been employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A rotary position detector comprising:
a housing having an inner space defined by an inner wall, wherein at least a portion of the inner wall is reflective;
a light source positioned to emit light rays into the housing inner space;
a base positioned within the housing inner space beneath the light source;
a light detector assembly positioned within the housing inner space and comprising a first number of substantially toroidal-sector-shaped light sensors positioned on the base and disposed in pairs about an axis of a motor shaft, each pair comprising one "A" detector element and one "B" detector element, the pairs disposed so that each "A" detector is circumferentially positioned between two "B" detectors and each "B" detector is positioned between two "A" detectors;
a light blocker affixed within the housing inner space for rotation with the motor shaft between the light detector assembly and the light source, the light blocker comprising a second number of opaque, substantially pie-shaped, substantially equal-surface-area elements arrayed about the motor shaft axis, the second number equal to one-half of the first number, an angular subtense of each of the light blocker elements greater than an angular subtense of a detector element, a radial extent of each of the light blocker elements greater than a radial extent of each of the detector elements, wherein at least a portion of a surface of the light blocker facing the light source is reflective so as to reflect light impinging thereon toward the reflective portion of the inner wall thus increasing an amount of light available for reaching the light detector elements, the inner wall reflecting light impinging thereon toward the light blocker and the light detector elements, and wherein at least some of the light rays are emitted directly toward the light detector assembly from the light source and at least some of the light rays are emitted away from the light blocker; and
a signal connection between the light detector elements and a circuit for measuring a signal from the "A" detectors and the "B" detectors relating to an amount of light falling thereon, a difference between the "A" detector signal and the "B" detector signal related to an angular position of the motor shaft.

2. The rotary position detector recited in claim 1, wherein the light source comprises a unitary light source, and further comprising a lens interposed between the light source and the light blocker, configured for receiving light from the light source and emitting substantially parallel light rays toward the light blocker.

3. The rotary position detector recited in claim 1, wherein the light source comprises a plurality of light sources positioned in radially spaced relation about the housing and a plurality of reflectors positioned in radially spaced relation above the light detector assembly, each reflector positioned to reflect the light rays emitted by at least one light source onto the light detector assembly.

4. The rotary position detector recited in claim 1, wherein the angular substance for each of the light blocker elements is greater than the angular substance for each of the detector elements by approximately 2°-10°.

5. The rotary position detector recited in claim 1, wherein:
the light sensors comprise a first type of light sensors having a first rotational sensitivity;
the light detector assembly further comprises a plurality of pairs of radially disposed, substantially toroidal-sector-shaped, high-accuracy light sensors having a second rotational sensitivity greater than the first rotational sensitivity; and
the light blocker has a plurality of radially disposed apertures therethrough, the apertures radially positioned to only uncover the high-accuracy light sensors during a rotation of the light blocker.

6. The rotary position detector recited in claim 5, wherein the high-accuracy light sensors are positioned radially inward from the light sensors of the first type.

7. A rotary position detector comprising:
a housing having an inner space;
a light source positioned to emit light rays into the housing inner space, wherein the light source comprises a unitary light source;
a base positioned within the housing inner space beneath the light source; a light detector assembly positioned within the housing inner space and comprising a first number of substantially toroidal-sector-shaped light sensors positioned on the base and disposed in pairs about an axis of a motor shaft, each pair comprising one "A" detector element and one "B" detector element, the pairs disposed so that each "A" detector is circumferentially positioned between two "B" detectors and each "B" detector is positioned between two "A" detectors;

a light blocker affixed within the housing inner space for rotation with the motor shaft between the light detector assembly and the light source, the light blocker comprising a second number of opaque, substantially pie-shaped, substantially equal-surface-area elements arrayed about the motor shaft axis, the second number equal to one-half of the first number, an angular subtense of each of the light blocker elements greater than an angular subtense of a detector element, a radial extent of each of the light blocker elements greater than a radial extent of each of the detector elements, wherein the light blocker comprises a lens having imposed thereon the light blocker elements, for receiving light from the light source and emitting substantially parallel light rays toward the light sensors; and a signal connection between the light detector elements and a circuit for measuring a signal from the "A" detectors and the "B" detectors relating to an amount of light falling thereon, a difference between the "A" detector signal and the "B" detector signal related to an angular position of the motor shaft.

8. A method of detecting a rotary position of a shaft comprising:

emitting light rays from a light source onto a light detector assembly comprising a first number of substantially toroidal-sector-shaped light sensors disposed in pairs about an axis of a motor shaft, each pair comprising one "A" detector element and one "B" detector element, the pairs disposed so that each "A" detector is circumferentially positioned between two "B" detectors and each "B" detector is positioned between two "A" detectors;

blocking a portion of the emitted light rays with a light blocker affixed for rotation with the motor shaft, the light blocker comprising a second number of opaque, substantially pie-shaped, substantially equal-surface-area elements arrayed about the motor shaft axis, the second number equal to one-half of the first number, an angular subtense of each of the light blocker elements greater than an angular subtense of a detector element, a radial extent of each of the light blocker elements greater than a radial extent of each of the detector elements, wherein the light detector assembly is housed at least partially in a housing having an inner space defined by an inner wall, and wherein at least a portion of the inner wall above the light blocker and at least a portion of a top surface of the light blocker facing the light source are reflective; and detecting a signal from the "A" detectors and from the "B" detectors relating to an amount of light falling thereon, a difference between the "A" detector signal and the "B" detector signal related to an angular position of the motor shaft, wherein the emitting step includes emitting at least some of the light rays directly toward the light detector assembly, reflecting light impinging on the light blocker top surface upward to the reflective portion of the inner wall to increase an amount of light available for reaching the light detector elements, emitting at least some of the light rays away from the light blocker, and reflecting light impinging on the inner wall downward toward the light blocker and light detector elements.

9. The rotary position detection method recited in claim 8, wherein the emitting step comprises directing light rays from a unitary light source through a lens interposed between the light source and the light blocker, for emitting substantially parallel light rays toward the light blocker.

10. The rotary position detection method recited in claim 8, wherein emitting step comprises reflecting light from a plurality of light sources positioned in radially spaced relation above the light blocker elements onto the light detector assembly.

11. The rotary position detection method recited in claim 8, wherein the emitting step comprises emitting light from a plurality of light sources radially arrayed above the light detector assembly and light blocker.

12. The rotary position detection method recited in claim 11, further comprising diffusing the emitted light sources upstream of the light blocker.

13. The rotary position detection method recited in claim 8, wherein the angular substance for each of the light blocker elements is greater than the angular substance for each of the detector elements by approximately 2°-10°.

14. The rotary position detection method recited in claim 8, wherein:

the light sensors comprise a first type of light sensors having a first rotational sensitivity;

the light detector assembly further comprises a plurality of pairs of radially disposed, substantially toroidal-sector-shaped, high-accuracy light sensors having a second rotational sensitivity greater than the first rotational sensitivity; and the light blocker has a plurality of radially disposed apertures therethrough, the apertures radially positioned to uncover the high-accuracy light sensors during a rotation of the light blocker.

15. The rotary position detection method recited in claim 14, wherein the high-accuracy light sensors are positioned radially inward from the light sensors of the first type.

16. A method of detecting a rotary position of a shaft comprising:

emitting light rays onto a light detector assembly comprising a first number of substantially toroidal-sector-shaped light sensors disposed in pairs about an axis of a motor shaft, each pair comprising one "A" detector element and one "B" detector element, the pairs disposed so that each "A" detector is circumferentially positioned between two "B" detectors and each "B" detector is positioned between two "A" detectors, the emitting including directing light rays from a unitary light source through a lens having imposed thereon the light blocker elements for emitting substantially parallel light rays toward the light sensors;

blocking a portion of the emitted light rays with a light blocker affixed for rotation with the motor shaft, the light blocker comprising a second number of opaque, substantially pie-shaped, substantially equal-surface-area elements arrayed about the motor shaft axis, the second number equal to one-half of the first number, an angular subtense of each of the light blocker elements greater than an angular subtense of a detector element, a radial extent of each of the light blocker elements greater than a radial extent of each of the detector elements; and detecting a signal from the "A" detectors and from the "B" detectors relating to an amount of light falling thereon, a difference between the "A" detector signal and the "B" detector signal related to an angular position of the motor shaft.

* * * * *